H. ROZE.
ELASTIC SUSPENSION FOR WHEELS OF CYCLES AND OTHER VEHICLES.
APPLICATION FILED JULY 12, 1910.
1,019,089.
Patented Mar. 5, 1912.
2 SHEETS—SHEET 2.
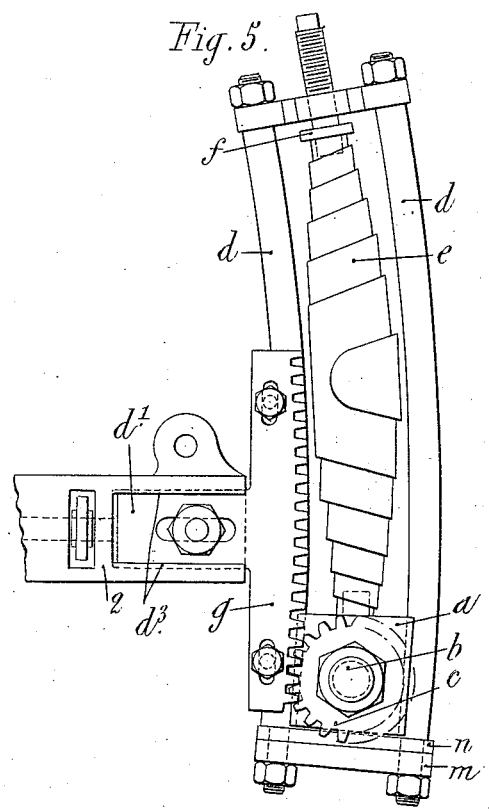
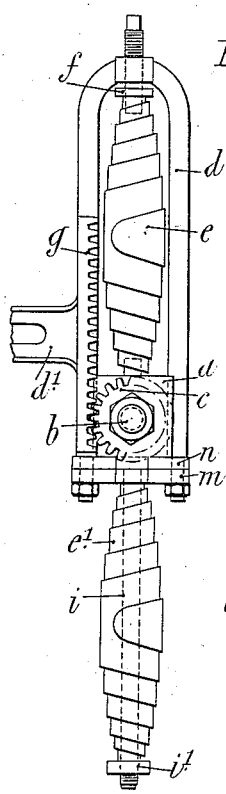
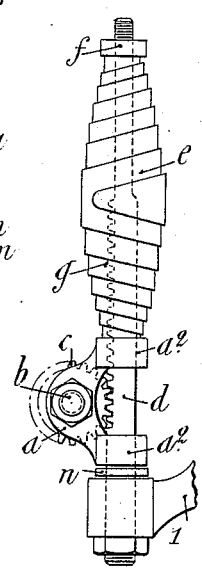
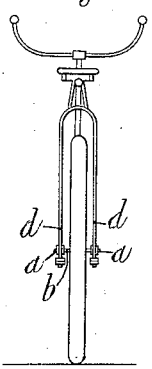
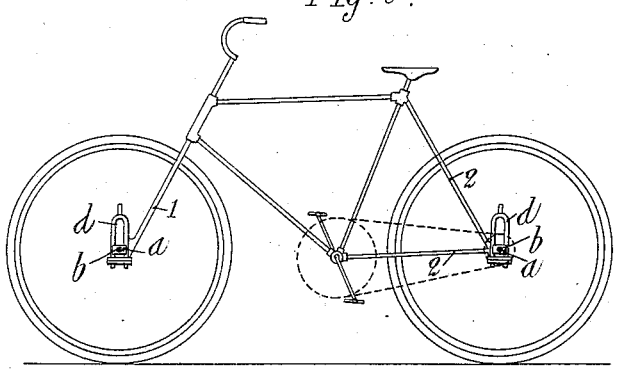
WITNESSES
W. P. Burke
L. Najek
INVENTOR
Henri Roze
BY Wm Wallace White
ATTY.

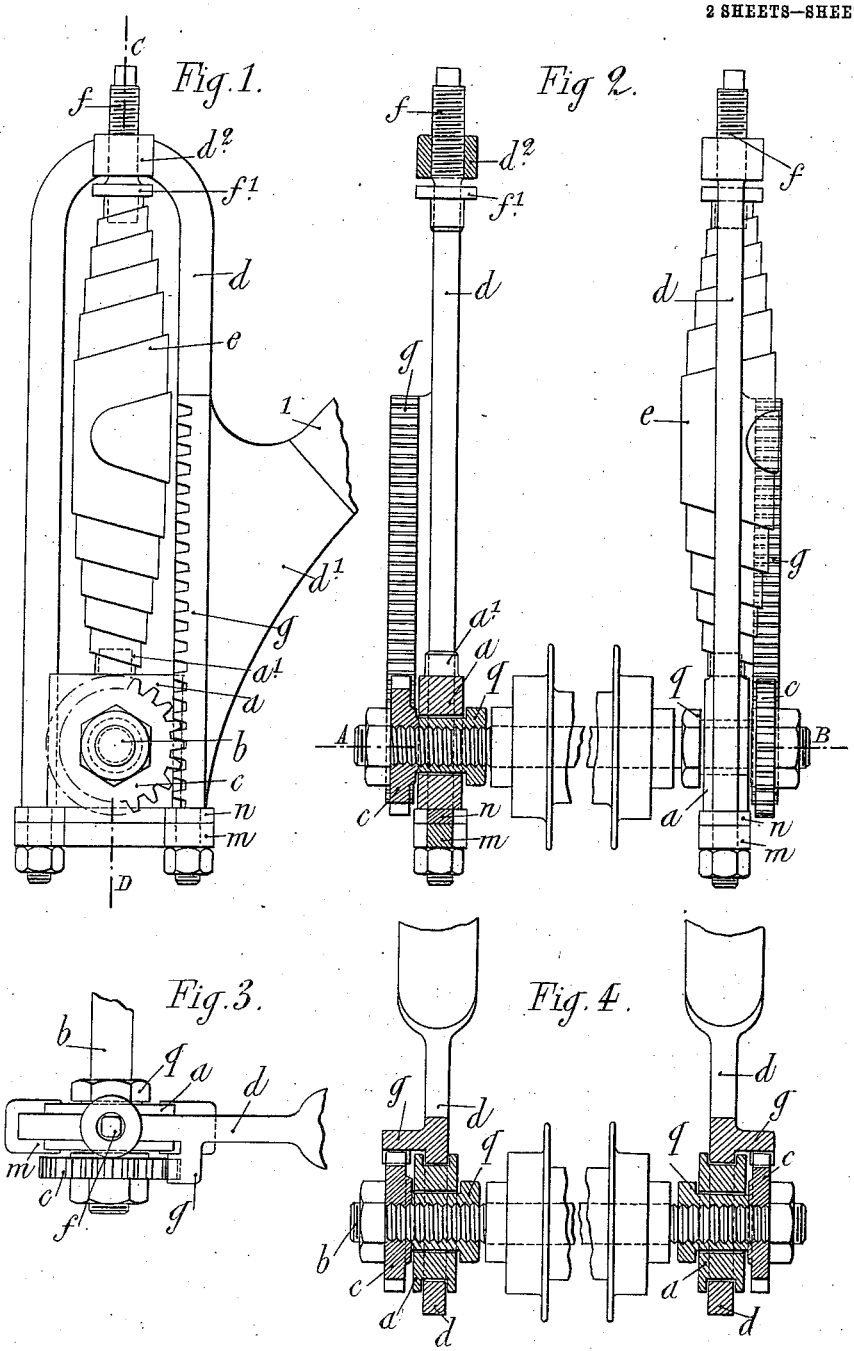

UNITED STATES PATENT OFFICE.

HENRI ROZE, OF DOMAINE DE HAUTE-FONTAINE, NEAR LES GRANDES CÔTES, FRANCE.

ELASTIC SUSPENSION FOR WHEELS OF CYCLES AND OTHER VEHICLES.

1,019,089. Specification of Letters Patent. Patented Mar. 5, 1912.

Application filed July 12, 1910. Serial No. 571,637.

*To all whom it may concern:*

Be it known that I, HENRI ROZE, citizen of the Republic of France, residing at Domaine de Haute-Fontaine, near Les Grandes Côtes, Marne, in the Republic of France, have invented new and useful Improvements in Elastic Suspension for the Wheels of Cycles and other Vehicles, of which the following is a specification.

This invention relates to the wheels of cycles and other vehicles and has for object a new and improved elastic suspension for the said wheels.

According to the invention, the spindle is guided at or near its ends and by means of bearing bushes in which it can turn freely, in the frame of the cycle supporting the said spindle, the frame piece for example, being provided with guide slots in the front or back forks; in this double guiding device the bearing bush and spindle can assume a limited reciprocating movement which is controlled by springs abutting against the bottom of the guide or against a suitable extension thereof.

In a preferred construction according to the invention the two ends of the spindle are provided in addition with two toothed members for example two similar pinions which engage with corresponding toothed members, such as two racks carried by the double guiding device so that the elastic displacement of the spindle and its bearing bushes can take place only parallel to the spindle itself.

Several modifications of the invention, applied by way of example to a bicycle, are illustrated in the accompanying drawings.

Figures 1 to 4 illustrate one form of construction Fig. 1 showing the devices in elevation, Fig. 2, on the left a section through C—D of Fig. 1 and on the right a front view, Fig. 3 a plan view corresponding to Fig. 1, and Fig. 4 a section through A—B of Fig. 2. Fig. 5 illustrates in side elevation another construction as applied to the back wheel of a bicycle. Figs. 6 and 7 are side elevations of two additional modifications. Figs. 8 and 9 illustrate in end and side elevation respectively, a bicycle both wheels of which are provided with the device according to the invention.

In all these constructions, each wheel spindle $b$ carries at each end a slide $a$ for which guides $d$ are provided in the ends of the branches of the front or back forks (1 or 2) of the machine frame.

In the example illustrated in Figs. 1 to 4, the spindle $b$ is provided at each end with a slide $a$ which forms a bearing bush guided in a stirrup or curved member $d$ whose lower ends are connected by a cover plate or cross piece $m$ having, if desired, a cushion plate $n$ of indiarubber or like flexible material. A spring $e$ abuts with its lower end on the upper face of the slide where it is centered by a projection $a'$, the other end of the spring pressing against an adjustable stop, which may conveniently consist in a screw $f$ with shoulder $f'$ passing through a tapped hole $d^2$ at the apex of the stirrup $d$. In this example the stirrup $d$ is rigidly fixed to a fitting $d'$ in the end of the corresponding branch of the fork 1.

It is obvious that the spindle $b$ can turn freely in the two bearing bushes $a$, either directly at a smooth part, or, as shown in the drawing a turned nut $q$ may be screwed on the spindle and its turned portion rotate in the bush $a$. At the same time the spindle $b$ and its two bushes $a$ can rise and fall in the two guides formed by the stirrups $d$, the elasticity of the movements being insured by the springs $e$ interposed between the bushes and the adjustable stops $f'$. In practice it is preferable to insure perfectly parallel displacements of the spindle $b$ by the regulating device illustrated, in which at each end of the spindle is fixed a pinion $c$ engaging with rack $g$ carried by the corresponding guide stirrup $d$. The pinions $c$ being alike, it is evident that the rise or fall, being accompanied by the rolling of the pinions over the racks, must take place so that the two ends of the spindle $b$ move exactly the same distance, or in other words the spindle $b$ can move only parallel to itself. The result of this is that the plane of the wheel remains fixed with respect to that of the forks or frame of the machine, and the wheel cannot get out of true with respect to the frame.

The stirrups or other guides $d$ instead of being rigidly connected to fittings $d'$ fixed in determined position on the end of the forks, may be fixed, as illustrated in Fig. 5 by means of a fitting $d'$ adapted to slide in a corresponding guide $d^3$ of the frame 2, this construction being specially suitable for the back wheel of the cycle. In addition the guide frame or stirrup *d* may, in this case, have the form of an arc of the circle whose center is the center of the usual driving sprocket wheel, which will not only allow the elastic suspension as hereinbefore described but will also permit the chain to retain its initial tension as determined by the position given to the slide *d'* in the guide *d³*. It is obvious that the racks *g* must be of curvature concentric to that of the guides *d d*.

In the modification illustrated in Fig. 6, the elastic suspension comprises two springs *e e'* at each end of the spindle *b*, these springs being exactly similar to the springs *e* of the previous constructions. The sliding bushes *a* in the modification of Fig. 6 each carry a rod *i* projecting downward from their lower faces and passing with clearance through central holes in the cover plates *m—n*. One end of the second spring *e'* abuts against the lower face of that cover plate and the other against a nut *i'* on the lower end of the rod *i*, the nut *i'* being thus adapted to regulate the tension of the spring. The effects of the two springs are added and the same amount of resiliency obtained in the previously described constructions are thereby secured with springs of smaller dimensions.

In the example of Fig. 7, which is particularly suitable to front wheels, each end of the spindle *b* is carried in a small stirrup or U-shaped member whose base *a* forms the bearing bush, and whose two arms terminate in rings *a²* within which slides a rod *d* fixed to the end of the corresponding branch 1 of the machine fork. The edge of the rod *d* facing the spindle *b* is provided with rack teeth *g* in which works the corresponding pinion *c* fixed to the wheel spindle. The upper branch *a²* of the U-shaped member acts as the lower abutment for the spring *e*. The latter is centered on the rod *d* and abuts at its upper end against a nut *f* forming an adjustable stop and screwed on the threaded end of the said rod.

Having now described my invention what I claim as new and desire to secure by Letters Patent is:—

1. In an elastic suspension for wheels, a wheel spindle, bearing bushes on each end of said wheel spindle forming slides, turned nuts screwed on the spindle and adapted to rotate with the same in said bearing bushes, guides in the frame of the vehicle with which said bushes slidingly engage, springs between said bushes and the tops of the guides, and means for positively maintaining said wheel spindle parallel to its normal position at all times.

2. In an elastic suspension for cycle wheels, a wheel spindle, bearing bushes on each end of said wheel spindle forming slides, turned nuts screwed on said spindle and adapted to rotate with the same in said bearing bushes, stirrup shaped guides connected to the cycle forks, said bushes slidingly engaging said guides, springs between said bushes and the tops of said guides, collared adjusting screws for said springs passing through tops of said guides, racks formed on the inside of each of said stirrup guides and pinions on each end of said wheel spindle, said pinions engaging with said racks, whereby said spindle will at all times be maintained parallel to its normal position.

In testimony whereof I have signed my name to this specification in the presence of two subscribing witnesses.

HENRI ROZE.

Witnesses:
LOUIS FAUTRAT,
H. C. COXE.

---

Copies of this patent may be obtained for five cents each, by addressing the "Commissioner of Patents, Washington, D. C."